US008547397B2

(12) United States Patent
Gachignard

(10) Patent No.: US 8,547,397 B2
(45) Date of Patent: Oct. 1, 2013

(54) PROCESSING OF AN IMAGE REPRESENTATIVE OF AN OBSERVATION ZONE

(75) Inventor: Olivier Gachignard, Montrouge (FR)

(73) Assignee: France Telecom, Paris (FR)

( * ) Notice: Subject to any disclaimer, the term of this patent is extended or adjusted under 35 U.S.C. 154(b) by 681 days.

(21) Appl. No.: 12/729,737

(22) Filed: Mar. 23, 2010

(65) Prior Publication Data

US 2010/0245386 A1 Sep. 30, 2010

(30) Foreign Application Priority Data

Mar. 24, 2009 (FR) ...................................... 09 51891

(51) Int. Cl.
*G09G 5/00* (2006.01)
*G06K 9/00* (2006.01)
*G01S 15/00* (2006.01)

(52) U.S. Cl.
USPC ............ 345/619; 345/625; 382/106; 367/100

(58) Field of Classification Search
None
See application file for complete search history.

(56) References Cited

U.S. PATENT DOCUMENTS

| 6,148,120 A | 11/2000 | Sussman |
| 6,324,453 B1 * | 11/2001 | Breed et al. ...................... 701/45 |
| 2008/0266576 A1 * | 10/2008 | Iwamoto ........................ 356/614 |

FOREIGN PATENT DOCUMENTS

| EP | 1 847 958 A2 | 10/2007 |
| JP | 06-15972 B2 | 3/1994 |

OTHER PUBLICATIONS

Pentland "A New Sense for Depth of Field", IEEE Transactions on Pattern Analysis and Machine Intelligence, vol. PAMI-9, No. 4, Jul. 1987.*
Gvili et al., "Depth keying," Applications of Digital Image Processing XXI: Jul. 21-24, 1998, San Diego, California, SPIE, Bellingham, VA, US, vol. 5006, pp. 564-574 (Jan. 1, 2003).

* cited by examiner

*Primary Examiner* — Tize Ma
*Assistant Examiner* — Yingchun He
(74) *Attorney, Agent, or Firm* — Drinker Biddle & Reath LLP

(57) ABSTRACT

A method for processing data, in particular an image representative of an observation zone in which is situated an object arranged with respect to a reference plane.
Such a method comprises the following steps:
reception of the image which has been captured beforehand by means of first and second image capture devices,
display (EV2) of the image received in a plane which comprises an object plane, containing said object, and said reference plane which has been determined beforehand as being the plane situated at the intersection of a conical beam and of a parallel beam emitted respectively by said first and second image capture devices,
determination (EV3), in the displayed image, of the number of pixels separating two contiguous sides, respectively of the object plane and of the reference plane, and extending along a determined direction (X or Y),
correlation (EV4) of the determined number of pixels with the value of the measurement of the real distance (d) which separates said object from said reference plane.

19 Claims, 4 Drawing Sheets

PROCESSING OF AN IMAGE REPRESENTATIVE OF AN OBSERVATION ZONE

CROSS-REFERENCE TO RELATED PATENT APPLICATION

This application claims the benefit of French Patent Application No. 09 51891, filed on Mar. 24, 2009, in the French Institute of Industrial Property, the entire contents of which is incorporated herein by reference.

FIELD OF THE INVENTION

The field of the invention pertains to the processing of data, in particular of an image representative of an observation zone in which is situated an object arranged with respect to a reference plane, with the aim of deducing the real distance which separates the object from said reference plane.

More precisely, in the course of such processing, the image of the object with respect to the reference plane is captured by first and second image capture devices, such as video cameras, in real time. The captured image is thereafter transmitted to an image processing device, and then displayed on a screen of the latter so as to be processed.

The invention finds a favoured but nonlimiting application in telemetry, videoconferencing or videophony.

BACKGROUND

In the field of videoconferencing or videophony, users do not generally wish to show an image of their intimate environment by using an image capture device such as a camera or a web camera ("webcam"). This reticence of users may constitute a psychological brake to the use of home videophony.

Moreover, in the field of radiocommunications, document EP 1 847 958 discloses a mobile terminal equipped with two miniature cameras which allows its user to transmit to another user, possessing a mobile terminal, a videophone message including an image composed essentially of a useful part corresponding for example to the user's silhouette or face. The information throughput required for the transmission of the message through the network is thus reduced since only the useful image part is transmitted, the remainder of the image, corresponding for example to the setting in which the user is situated, being deleted by appropriate processing.

A drawback of the aforesaid mobile terminal resides in the fact that the image restored on the mobile terminal of the opposite party exhibits a low resolution, the screen of a mobile terminal exhibiting a reduced size.

In the prior art, there also exist infrared sensor-based systems which use projections of electromagnetic waves in the infrared in a particular scene and analyse the projected waves so as to distinguish between people and objects.

However, these systems require a complex and expensive installation which turns out to be unsuited to applications such as videoconferencing. Furthermore, such systems exhibit the drawback of generating a relatively significant snapshot latency time which is caused by the reinitialization of the infrared sensor after each image capture. Finally, the definition of the image obtained by such systems is relatively mediocre.

SUMMARY

One of the aims of the invention is to remedy drawbacks of the aforementioned prior art.

For this purpose, according to a first aspect, the present invention relates to a method for processing data, in particular an image representative of an observation zone in which is situated an object arranged with respect to a reference plane, comprising the following steps:
  reception of the image which has been captured beforehand by means of first and second image capture devices,
  display of the image received.

Such a method is noteworthy in that it comprises the following steps:
  in the course of the display step, display of the image in a plane which comprises an object plane, containing the object, and the reference plane which has been determined beforehand as being the plane situated at the intersection of a conical beam and of a parallel beam emitted respectively by the first and second image capture devices,
  determination in the displayed image of the number of pixels separating two parallel and contiguous sides, respectively of the object plane and of the reference plane, and extending along a determined direction,
  correlation of the determined number of pixels with the value of the measurement of the real distance which separates the object from the reference plane.

By virtue of the simple coupling of a standard image capture device with conical beam and of an image capture device with parallel beam that is much less complex and expensive than an image capture device with Infrared sensor, the image of the observation zone displayed makes it possible almost in real time to distinguish to within a pixel the object from the reference plane, and then to very precisely deduce therefrom the distance which actually separates the object from said reference plane.

The processing of the image is moreover performed more rapidly than with the Infrared image sensor-based systems of the prior art, with a definition of the image meeting the criteria of High Definition.

In one embodiment, the aforesaid correlation step is followed by a calculation step for calculating the distance of the object with respect to the first and second image capture devices.

Such an arrangement allows direct application of the processing method to telemetry techniques, such as used for example in the field of architecture, medicine, etc. or to object segmentation within the framework for example of a videoconference.

In another embodiment, in the case where a sound is emitted by the object or in the vicinity of the latter, the method comprises the following steps:
  calculation of the real distance which separates the object from the reference plane, on the basis of the intensity of the sound emitted,
  comparison of the calculated real distance with the real distance obtained in the course of the correlation step.

Such an arrangement makes it possible to refine the measurement of the real distance and in particular to remove the doubt as to the arrangement of the object in front of or behind the reference plane.

In another embodiment, when at least one other object is situated in the observation zone, the correlation step is followed by a comparison step for comparing the real distances which separate each object from the reference plane.

Such an arrangement thus makes it possible to very precisely discriminate each object with respect to the reference plane, before any other processing of the image, such as a segmentation for example. This makes it possible in particular to remove any doubt which might persist as to the arrangement of such and such an object in front of or behind the reference plane.

In yet another embodiment, the processing method according to the invention comprises a segmentation step for segmenting the image received.

In the case where the observation zone comprises in particular several objects, for example a person, a tree and a panel arranged respectively in front of and behind the person, the image segmentation according to the invention makes it possible to obtain a segmented image which represents for example just the person, although the latter is situated between two objects in the observation zone. Such a segmentation is rendered possible by three successive precise distance measurements in accordance with the invention, the first providing the value of the distance between the tree and the reference plane, the second providing the value of the distance between the person and the reference plane, and the third providing the value of the distance between the panel and the reference plane.

Such a segmentation exhibits the advantage of not requiring a particular setting in the observation zone, such as a monochrome, conventionally blue, background, and can therefore be executed without constraints anywhere.

In the case of a videophone application, where the object situated in the observation zone is the user himself, the segmented image thus modified can represent the user in a setting selected by the latter.

Correlatively, according to a second aspect, the present invention relates to a device for processing data, in particular an image representative of an observation zone in which is situated an object arranged with respect to a reference plane, comprising:

means for receiving the image which has been captured beforehand by means of first and second image capture devices,
means for displaying the image received.

Such a device is noteworthy in that:

the display means are designed to display the image in a plane which comprises an object plane, containing the object, and the reference plane which has been determined beforehand as being the plane situated at the intersection of a conical beam and of a parallel beam emitted respectively by the first and second image capture devices, and in that it furthermore comprises:

means for determining in the displayed image the number of pixels separating two contiguous sides, respectively of the object plane and of the reference plane, and extending along a determined direction,
means for correlating the determined number of pixels with the value of the measurement of the real distance which separates the object from the reference plane.

In one embodiment, the processing device comprises means for calculating the distance of the object with respect to the first and second image capture devices.

In another embodiment, the processing device furthermore comprises:

means for calculating, in the case where a sound is emitted by the object or in the vicinity of the latter, the real distance which separates the object from the reference plane, on the basis of the intensity of the sound emitted,
means for comparing the calculated distance with the distance obtained by the correlation means.

In another embodiment, the processing device comprises comparison means for comparing the real distance which separates the object from the reference plane with the real distance which separates another object from the reference plane, in the observation zone.

In yet another embodiment, the processing device comprises means for segmenting the image received.

According to a third aspect, the present invention relates to a system for measuring a real distance between at least one object and a reference plane, comprising first and second image capture devices for capturing an observation zone in which is situated the object with respect to the reference plane.

Such a system is noteworthy in that it comprises:

means for determining the reference plane as being the plane situated at the intersection of a conical beam and of a parallel beam emitted respectively by the first and second image capture devices,
a device for processing data comprising:
means for receiving an image of the captured observation zone,
means for displaying the image received in a plane which comprises an object plane, containing the object, and the reference plane,
means for determining in the displayed image the number of pixels separating two contiguous sides, respectively of the object plane and of the reference plane, and extending along a determined direction,
means for correlating the determined number of pixels with the value of the measurement of the real distance which separates the object from the reference plane.

In one embodiment, the system furthermore comprises an acoustic measurement device which is intended to measure the intensity of a sound emitted by the object or in the vicinity of the latter, the device for processing data furthermore comprising:

means for receiving the value of the measured Intensity originating from the acoustic measurement device,
means for calculating the real distance which separates the object from the reference plane, on the basis of the intensity of the sound emitted,
means for comparing the calculated distance with the distance obtained by the correlation means.

The invention is also aimed at a computer program comprising instructions for the execution of the steps of the above-mentioned distance measurement method, when the program is executed by a device for processing an image representative of an observation zone in which is situated an object arranged with respect to a reference plane, comprising means for receiving the image which has been captured beforehand by means of first and second image capture devices, and means for displaying the image received.

This program can use any programming language, and be in the form of source code, object code, or of code intermediate between source code and object code, such as in a partially compiled form, or in any other desirable form.

Yet another object of the invention is also aimed at an information medium readable by a computer, and comprising instructions for a computer program such as mentioned above.

The information medium can be any entity or device capable of storing the program. For example, such a medium can comprise a storage means, such as a ROM, for example a CD ROM or a microelectronic circuit ROM, or else a magnetic recording means, for example a diskette (floppy disc) or a hard disc.

Moreover, such an information medium can be a transmissible medium such as an electrical or optical signal, which can be conveyed via an electrical or optical cable, by radio or by other means. The program according to the invention can in particular be downloaded from a network of Internet type.

Alternatively, such an information medium can be an integrated circuit into which the program is incorporated, the circuit being adapted to execute or to be used in the execution of the method in question.

The aforementioned device for processing data, the system and the computer program exhibit at least the same advantages as those imparted by the method according to the present invention.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION

Figure 1:
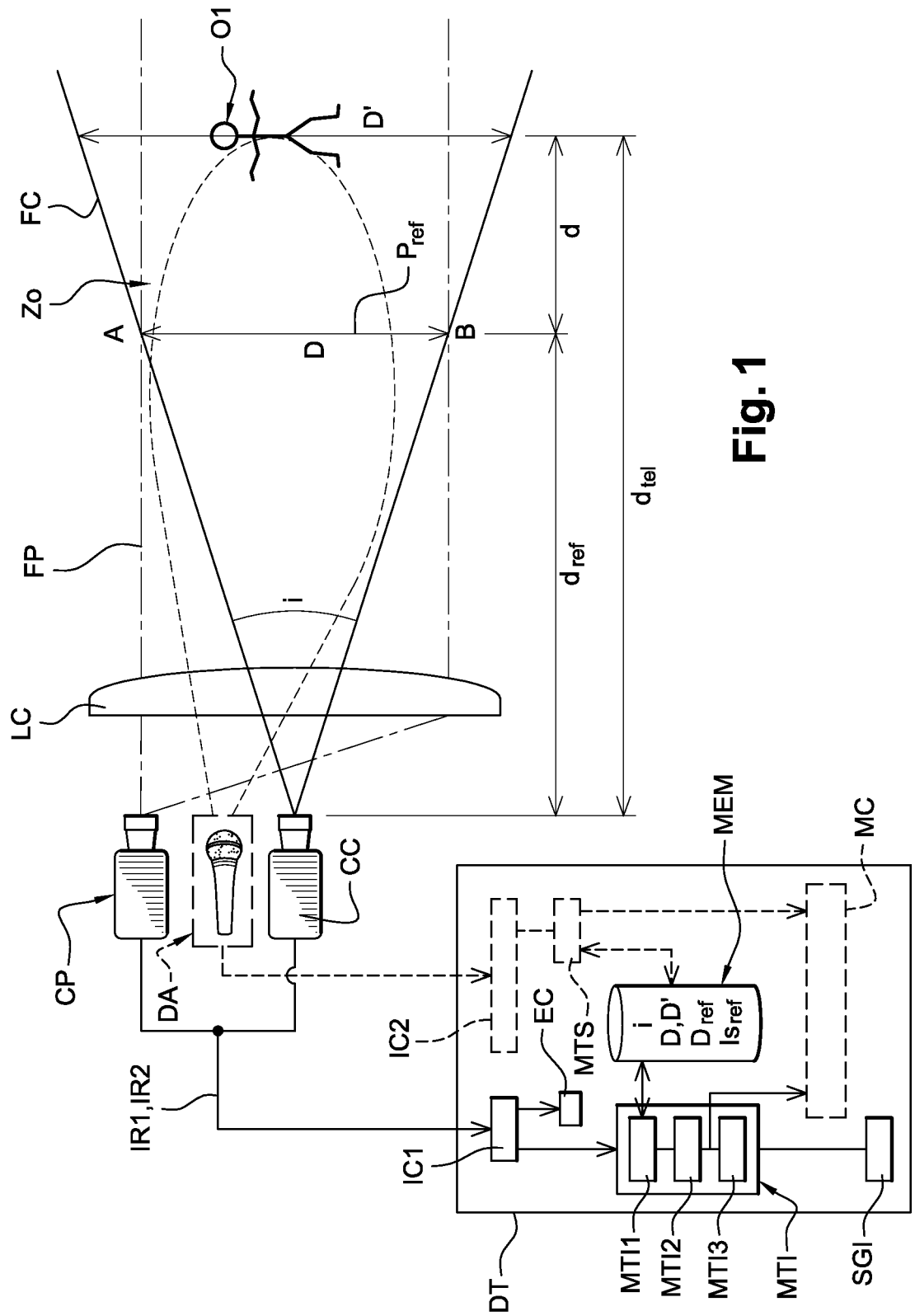
FIG. 1 is a schematic representation of the general architecture in which the distance measurement method in accordance with the invention is implemented.

FIG. 1 represents in a general manner, according to one embodiment, the general architecture of the system in which the distance measurement method according to the invention is implemented.

According to the invention and in accordance with the example represented in FIG. 1, the distance measurement system comprises mainly:
 a first visible image capture device CC,
 a second visible image capture device CP,
 and a computer-based device DT for processing data.

The first image capture device CC and the second image capture device CP are arranged facing the object O1 situated in an observation zone ZO, said object O1 being, in the example represented, an individual.

The first and second image capture devices CC and CP are adjusted so as to have a vision of the same observation zone ZO and to capture images relating to the same objects of the observation zone ZO. The capture devices CC and CP are for example arranged side-by-side or one above the other.

The first image capture device CC, also termed image taking device, is for example a digital photographic apparatus, a digital or analogue video camera, a camcorder or a web camera. Such a first image capture device is designed to emit a conical beam FC towards the individual O1.

A visible image captured by the first image capture device CC is composed either of an image captured by a digital photographic apparatus for example, or of several images forming a video sequence captured by a camera or a camcorder for example. The first image capture device CC transmits a digital real image IR1 representative of the observation zone ZO to the processing device DT.

Advantageously according to the invention, the second image capture device CP, also termed image taking device, is of telecentric type, that is to say it emits a parallel beam FP towards the individual O1. Such a second image capture device is distinguished from the first image capture device only by the fact that it is arranged, as a function of the context of use, at the focus of a convergent lens or of a concave mirror (parabolic or spherical). The example represented involves a convergent lens LC.

According to the invention, the first and second image capture devices CC and CP are furthermore adjusted in such a way that the two beams, conical and parallel, emitted respectively by the latter cross one another at two fixed points A and B, so as to determine a fixed plane which constitutes a reference plane $P_{ref}$ with respect to which the object O1 is arranged. The reference plane $P_{ref}$ is thus situated at a constant distance $d_{ref}$ from the first and second image capture devices CC and CP, the object O1 being for its part situated at a variable distance d from the reference plane $P_{ref}$, since the individual who here represents the object O1 may move around in the observation zone ZO.

As in the case of the first image capture device CC, a visible image IR2 captured by the second image capture device CP is composed either of an image captured by a digital photographic apparatus for example, or of several images forming a video sequence captured by a camera or a camcorder for example.

Having regard to its telecentrism properties, the second image capture device CP transmits to the processing device DT the real image IR2 representative of the observation zone ZO in which the object O1 is situated with respect to the reference plane $P_{ref}$.

The object O1 in the reference plane $P_{ref}$ such as captured by the second image capture device CP thus appears in an always sharp manner and without modification of its initial size, whatever the distance which separates it from the second image capture device CP.

The data processing device DT is a computer-based device which comprises:
 a first communication interface IC1 which is adapted for communicating with the first and second image capture devices CC and CP, so as to receive the images IR1 and IR2 captured respectively by them,
 a user interface comprising a viewing screen EC, a keyboard (not represented) and a pointing device (not represented), such as for example a mouse,
 an image processing module MTI.

In a particularly advantageous manner, the viewing screen EC exhibits a high definition of resolution.

Figure 2:
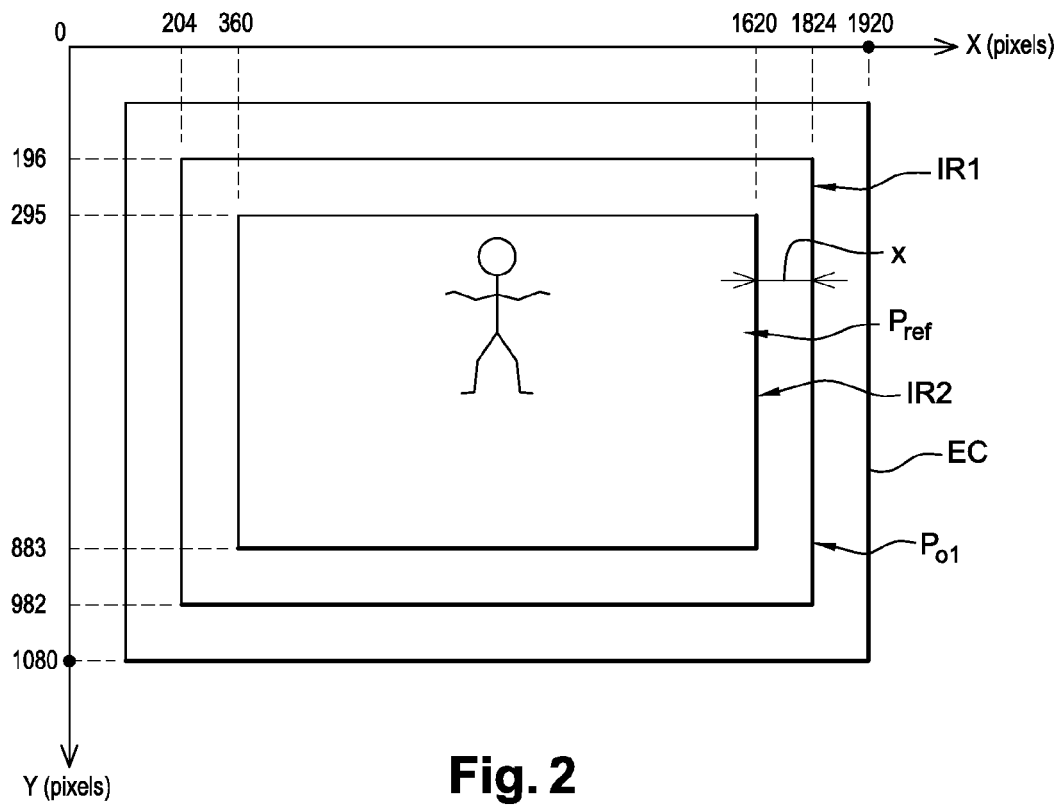
FIG. 2 represents the image of the observation zone captured in the case where a single object is situated in the observation zone.

As may be seen in FIG. 2, a high-definition screen EC such as this exhibits for example a resolution of 1920×1080 pixels.

The screen EC makes it possible to display said images IR1 and IR2 transmitted, respectively in a first plane which corresponds to an object plane $P_{O1}$ comprising said object O1, namely the individual in the example represented, and in a second plane corresponding to the reference plane $P_{ref}$.

The pixellic mismatch, in the X direction or in the Y direction, between two contiguous edges, respectively of the images IR1 and IR2, advantageously corresponds to the depth d which separates the object O1 from the reference plane $P_{ref}$ in the observation zone ZO, such as represented in FIG. 1.

Therefore, it is possible to determine to within a pixel the offset that exists between the two displayed images IR1 and IR2 so as thereafter to deduce therefrom the real depth d.

In the exemplary screen represented in FIG. 2, it is considered that an offset of 1 pixel between the two images IR1 and IR2 corresponds to a real depth d equal to 1 mm.

Again with reference to FIG. 1, the image processing module MTI is a software module which is stored in a read-only memory (not represented) of the processing device DT.

The image processing module MTI comprises in particular:
  a first calculation sub-module MTI1 for determining in the displayed image the pixellic mismatch in X or in Y between two contiguous sides, respectively of the image IR1 and of the image IR2,
  a second calculation sub-module MTI2 for correlating the determined number of pixels with the value of the measurement of the real distance d which separates the object O1 from said reference plane $P_{ref}$.

In the case of a telemetry application, the image processing module MTI furthermore comprises a third calculation sub-module MTI3 for calculating the distance of the object O1 with respect to the first and second image capture devices CC and CP.

For example, the data processing device DT is a personal computer or a mobile terminal, such as for example a portable computer.

According to other examples, the data processing device DT comprises any communicating domestic terminal portable or otherwise such as a video games console, or an intelligent television receiver cooperating with a remote control with display, a decoder of the Set-Top-Box type, or an alphanumeric keyboard also serving as mouse through an infrared link.

For example, the first and second image capture devices CC and CP are linked by way of USB cables to the data processing device DT which is a personal computer.

Figure 3:
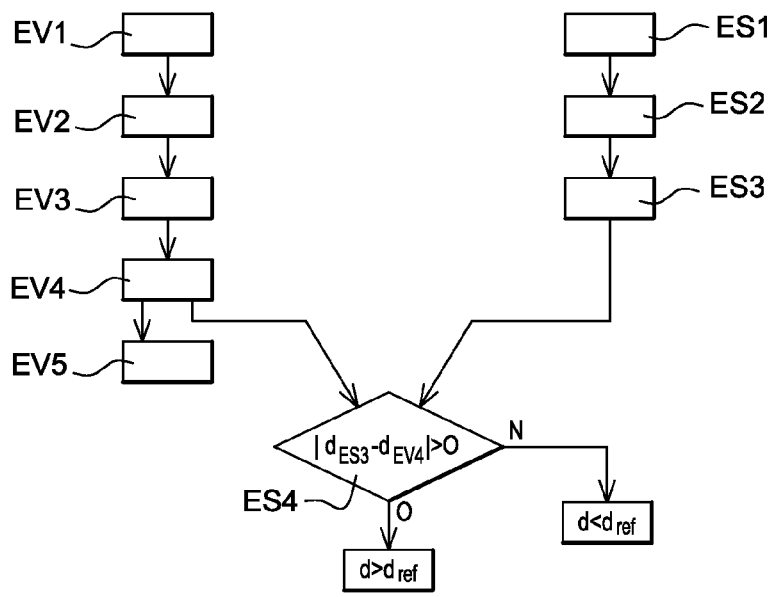
FIG. 3 represents a flowchart of the distance measurement method in accordance with the invention.

With reference to FIG. 3, the method for processing data in accordance with the first embodiment will now be described.

In the course of a step EV1 represented in FIG. 3, the first and second image capture devices CC and CP are calibrated and synchronized: the focal lengths of the two devices are adjusted, mechanically and/or electrically, and time bases in the devices are mutually synchronous so as to capture and restore, at the same instants, images relating to the same objects of the observation zone ZO, and markers for viewing the captured digital images coincide.

The calibration operation makes it possible in particular to fix beforehand certain values represented in FIG. 1, such as:
  the angle i of the conical beam FC emitted by the first image capture device CC,
  the distance D between the two intersection points A and B of the conical beam FC and parallel beam FP,
  the distance $d_{ref}$ which separates the reference plane $P_{ref}$ from the first and second image capture devices CC and CP.

These constants are then stored in a memory MEM of the processing device DT.

In the course of a step EV2 represented in FIG. 3, the images captured by the image capture devices CC and CP, that is to say the real images IR1 and IR2, are transmitted to the data processing device DT.

In the course of this same step, with reference to FIG. 1, the first communication interface IC1 transmits the images captured IR1 and IR2 onto the viewing screen EC, which restores them, and then displays them, as well as to the image processing module MTI.

For example, as shown schematically in FIG. 2, in two juxtaposed windows of the screen EC are displayed respectively the real image IR1, captured by the conical-beam image capture device CC, and the image IR2 of the reference plane $P_{ref}$ captured by the parallel-beams image capture device CP.

The image IR2 which contains the reference plane $P_{ref}$ is displayed on the screen EC according to a predefined size, namely 1260×588 pixels, by virtue of the following trigonometric relation: $\tan(i/2)=d_{ref}/2D$.

The image IR1 which contains the object plane $P_{O1}$ is displayed on the screen EC likewise according to a likewise predefined size, namely 1620×786 pixels, by virtue of the following trigonometric relation: $\tan(i/2)=d_{ref}/2D'$, where D' represents the distance of opening spread of the conical beam FC in the object plane $P_{O1}$.

In the course of a step EV3 represented in FIG. 3, the calculation sub-module MTI1 of the image processing module MTI determines on the screen EC the pixellic mismatch in the X direction for example, between two contiguous sides, respectively of the image IR1 and of the image IR2. In the example represented in FIG. 2, the sub-module MTI1 determines a negative mismatch of 204 pixels in the X direction. This signifies that the object O1 is in reality behind the reference plane $P_{ref}$, and therefore further than the latter from the first and second image capture devices CC and CP.

Should the object O1 have been arranged in front of the reference plane $P_{ref}$, that is to say nearer the image capture devices CC and CP, the sub-module MTI1 would then have determined a positive mismatch of pixels in the X direction.

In the course of a step EV4 represented in FIG. 3, the second calculation sub-module MTI2 of the image processing module MTI correlates the determined number of pixels, 204, with the value of the measurement of the real distance d which separates the object O1 from said reference plane $P_{ref}$.

Since 1 pixel between the two images IR1 and IR2 corresponds to a real depth d equal to 1 mm, as was mentioned above in the description, the module MTI2 determines precisely that the real distance d is equal to 204 mm.

In the case of a telemetry application, in the course of a step EV5 represented in FIG. 3, the third calculation sub-module MTI3 of the image processing module MTI determines the real distance, denoted $d_{tel}$ in FIG. 1, which separates the object O1 from the image capture devices CC and CP.

For this purpose, the sub-module MTI3 calculates $d_{tel}=d_{ref}+d$. If for example $d_{ref}$ is equal to 50 cm, $d_{tel}=50+20.4=70.4$ cm.

The second embodiment, such as represented dashed in FIG. 1, is distinguished from the first embodiment, by the addition of an acoustic measurement device DA which is arranged in proximity to the image capture devices CC and CP.

In the example represented, the acoustic measurement device DA is arranged in the plane of the objectives of the two image capture devices CC and CP.

The acoustic measurement device DA is intended to measure the intensity Is of the sound which is emitted directly by the object O1 or by another object arranged in proximity to the object O1.

In the example represented, the object O1 being an individual, it is the sound intensity of the speech of the individual O1 which will be measured.

In the example represented, the acoustic measurement device DA is a sound meter coupled to a microphone.

The acoustic measurement device DA is furthermore adapted for transmitting the intensity Is measured to the data processing device DT, with a view to determining by the latter the real distance d which separates the object O1 from the reference plane $P_{ref}$.

For this purpose, the data processing device DT furthermore comprises:

a second communication interface IC2 which is adapted for communicating with the acoustic measurement device DA, so as to receive in real time the value of the sound intensity Is measured by the latter, a sound processing module MTS.

The sound processing module MTS is a software module which is stored in a read-only memory (not represented) of the processing device DT. The module MTS is adapted for calculating the real distance d which separates the object O1 from the reference plane on the basis of the physical equation of a sound wave in air Is (dB)=10 log($d^2$).

Finally, the data processing device DT comprises a comparison module MC which is likewise a software module stored in the read-only memory of the processing device DT. The module MC is intended to compare the real distance calculated by the sound processing module MTS with the real distance obtained by the correlation module MTI2 of the aforesaid image processing module MTI, so as to deduce therefrom a refined measurement of the real distance d.

The method for processing data in accordance with the second embodiment will be described with reference again to FIG. 3.

In the course of a step ES1 represented in FIG. 3, the acoustic measurement device DA is calibrated: for this purpose, the latter is arranged in the reference plane $P_{ref}$ so as to measure the reference sound intensity $Is_{ref}$ of the sound emitted by the object O1.

In the course of this same step, the reference sound intensity $Is_{ref}$ is transmitted to the processing device DT, and is then stored in the memory MEM of the latter.

In the course of a step ES2 represented in FIG. 3, the acoustic measurement device DA is arranged in the plane of the objectives of the image capture devices CC and CP, as represented in FIG. 1, and then measures the intensity Is of the sound emitted by the individual O1.

In the course of this same step, with reference to FIG. 1, the second communication interface IC2 transmits the sound intensity Is to the sound processing module MTS.

In the course of a step ES3 represented in FIG. 3, the calculation module MTS calculates the real distance d which separates the individual O1 from the reference plane as a function of the sound intensity Is measured, in accordance with the equation $d=d_{ref}\sqrt{(Is/Is_{ref})}$.

The distance d is greater than $d_{ref}$, thereby signifying that the individual O1 is indeed behind the reference plane $P_{ref}$.

If the distance d had been less than $d_{ref}$, it would have been deduced that the individual O1 was situated in front of the reference plane $P_{ref}$, that is to say between the two image capture devices CC and CP and the reference plane $P_{ref}$.

In the course of this same step, the sound processing module MTS transmits the real distance d which has just been calculated to the comparison module MC represented in FIG. 1.

In the course of a step ES4 represented in FIG. 3, the comparison module MC compares the real distance which has just been calculated by the sound processing module MTS with the real distance which was evaluated previously by the calculation sub-module MTI2 in the course of step EV4. Such a comparison consists for example in calculating the absolute value of the aforesaid real distances.

Such a comparison step makes it possible to obtain a precise measurement of the value of the real distance d, which can thereafter be used for the calculation of the distance $d_{rel}$ performed in step EV5 of the aforesaid first embodiment.

In accordance with the third embodiment, the processing device DT furthermore comprises an image segmentation module SGI represented in FIG. 1. Such a module is conventional as such and, for this reason, will not be described in detail.

The image segmentation module SGI turns out to be particularly useful in the case where several objects are arranged in the observation zone ZO.

Figure 4:
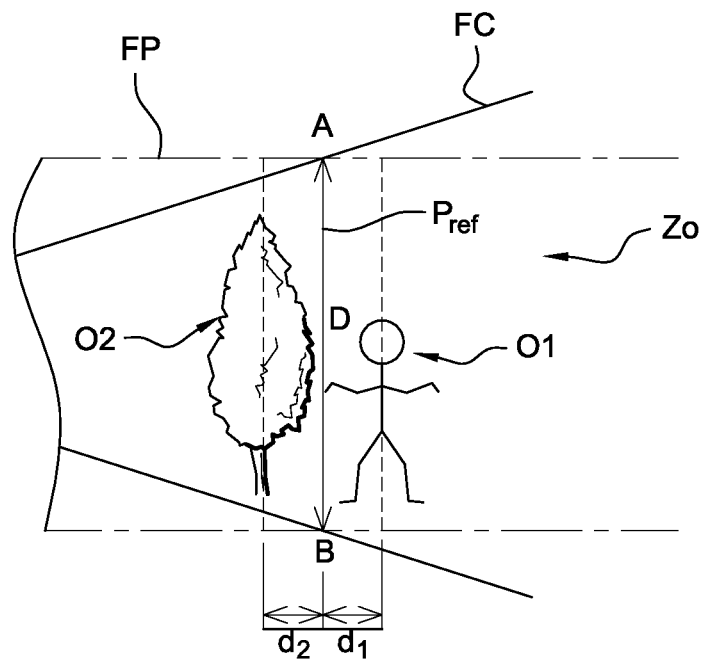
FIG. 4 is a partial view of the observation zone represented in FIG. 1, in which two objects are situated.

FIG. 4, which is a magnified partial view of the zone ZO of FIG. 1, represents an example where two objects O1 and O2 are arranged very close together in the observation zone ZO.

In the example represented, the object O1 is an individual and the object O2 is a tree, the individual O1 being partially hidden by the tree O2. The individual O1 is arranged at a distance d1 from the reference plane $P_{ref}$, slightly behind the latter. The tree O2 is arranged at a distance d2 from the reference plane $P_{ref}$, slightly in front of the latter.

The method for processing data in accordance with the third embodiment will be described with reference now to FIG. 5.

Steps EV'1 to EV'4, identical respectively to steps EV1 to EV4 described above in relation with the first embodiment, are performed so as to determine on the one hand the real distance d1, and, on the other hand the real distance d2.

Figure 6:
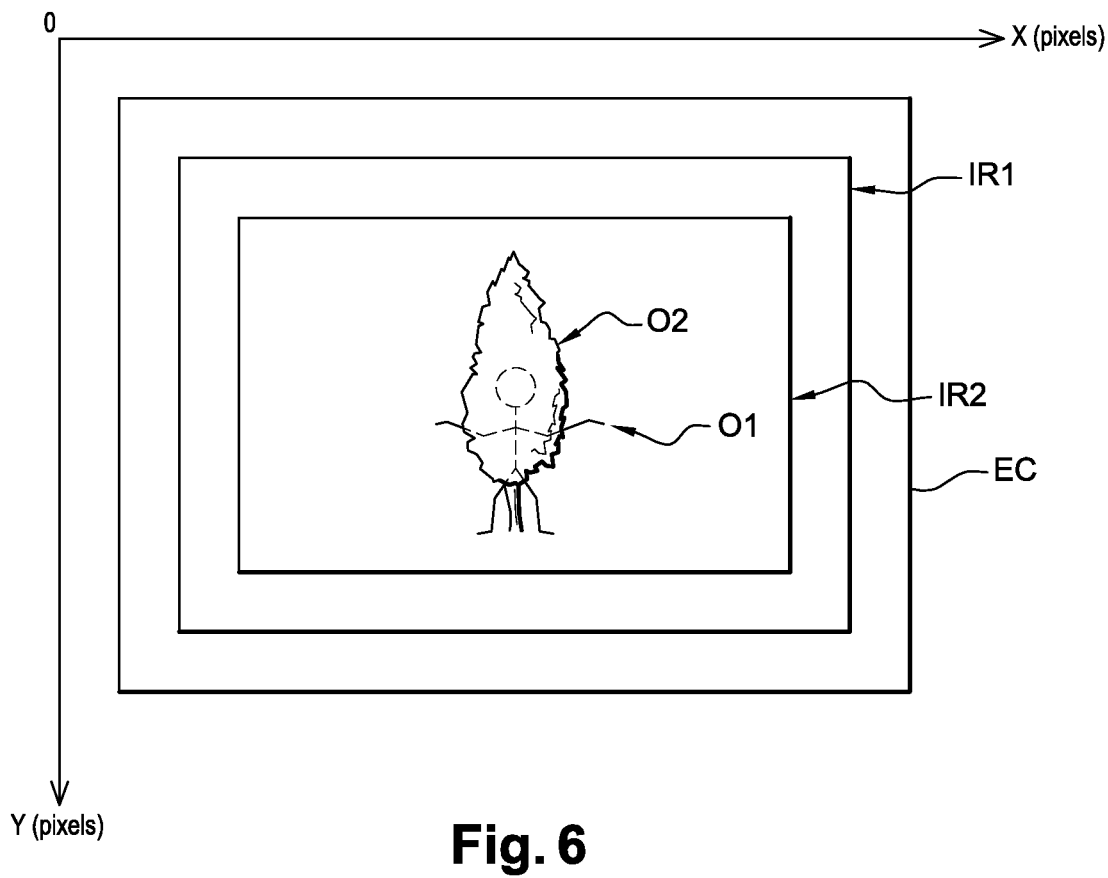
FIG. 6 represents the image of the observation zone captured in the case of the embodiment represented in FIG. 4.

In particular in the course of step EV'2, the image representing the individual O1 and the tree O2 is displayed on the screen EC of the processing device DT, as represented in FIG. 6. Only the limbs of the individual O1 are visible in this figure.

In the case where the objects O1 and O2 are very close to the reference plane $P_{ref}$, as is the case in FIG. 4, and when a doubt persists as to the matter of knowing whether they are arranged in front of or behind the reference plane $P_{ref}$, the calculation sub-module MTI2 of FIG. 1 transmits, in the course of step EV'4 represented in FIG. 3, the two real distances d1 and d2 to the comparison module MC represented in FIG. 1.

In the course of a step EV'5 represented in FIG. 5, the comparison module MC then performs one of the calculations below, so as to discriminate the object O1 from the object O2 as precisely as possible, with respect to the reference plane $P_{ref}$:

if d1>0 and d2>0 then d(1->2)=|d1−d2|=abs(d1−d2)

if d1<0 and d2>0 then d(1->2)=|d1|+|d2|=abs(d1)+abs(d2)

if d1>0 and d2<0 then d(1->2)=|d1|+|d2|=abs(d1)+abs(d2)

if d1<0 and d2<0 then d(1->2)=||d1|−|d2||=abs(abs(d1)−abs(d2))

In the example represented in FIG. 4, the comparison module MC performs the following calculation d(1->2)=|d1|+|d2|=abs(d1)+abs(d2), since d1<0 and d2>0.

It is thus determined with certainty that the individual O1 and the tree O2 are indeed respectively behind and in front of the reference plane $P_{ref}$.

According to a particular application, the individual O1 communicates for example in an interactive manner with a remote talker (not represented) in the course of a videoconference and wishes to transmit to the talker only a part of the image displayed on the screen EC in FIG. 6, in such a way that the remote talker makes out in the transmitted image only the individual O1, and not the tree O2 which partially masks the individual O1.

Figure 5:
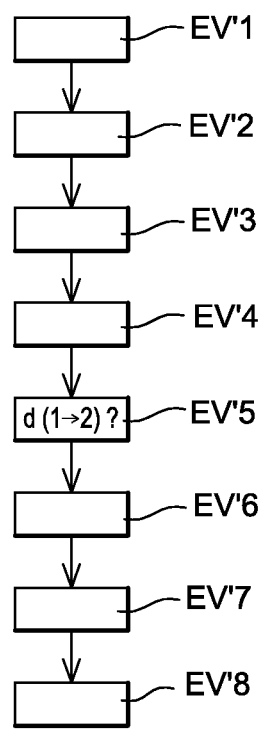
FIG. 5 represents a flowchart of the distance measurement method in accordance with the embodiment represented in FIG. 4.

In this case, in the course of a step EV'6 represented in FIG. 5, the data of the image represented in FIG. 6 are transmitted to the image segmentation module SGI represented in FIG. 1. In the course of this same step, the segmentation module SGI selects, according to a scheme known as such, the groups of pixels which are associated solely with the individual O1.

Figure 7:
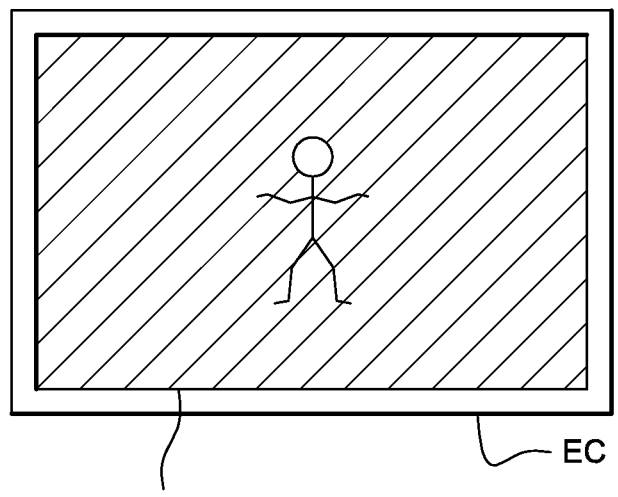
FIG. 7 represents an image obtained after segmentation of the image represented in FIG. 6.

In the course of a following step EV'7 represented in FIG. 5, a module (not represented) for merging images of the processing device DT displays on the screen EC only the selected pixels associated with the individual O1 so as to form a segmented image IMS, represented in FIG. 7, the residual part of the real image being for example displayed in the form of a monochrome background, for example black, represented by hatching in FIG. 7.

In the course of a following step EV'8 represented in FIG. 5, the module for merging captured images modifies the segmented image IMS by inserting into the backdrop of the latter a stationary or moving background image selected beforehand, for example by the individual O1 or a user of the system, so that the individual O1 appears for example in a virtual setting.

The image segmentation module SGI then transmits the modified segmented image to a terminal of the talker with whom the individual O1 communicates via a videoconference.

It goes without saying that the embodiments which have been described above were given purely by way of wholly non-limiting indication, and that numerous modifications can easily be made by the person skilled in the art without, however, departing from the scope of the invention.

The invention claimed is:

1. A method for processing data, in particular an image representative of an observation zone in which is situated an object arranged with respect to a reference plane situated at a constant distance from a first image capture device and a second image capture device, the first image capture device being able to capture a conical beam and the second image capture device being able to capture a parallel beam, the object being for its part situated at a variable distance from the reference plane, said reference plane being situated at the intersection of the conical beam and of the parallel beam, comprising the following steps:
    reception of two images which have been captured beforehand by means of the first and second image capture devices respectively,
    display of said images received,
    in the course of the display step, display of said images in two juxtaposed windows of a screen, the first window comprising an object plane including said object, and the second window comprising the reference plane,
    determination, in the displayed image, of the number of pixels separating two contiguous sides and parallels, respectively of the object plane and of the reference plane, and extending along a determined direction (X or Y),
    correlation of the determined number of pixels with the value of the measurement of the real distance which separates said object from said reference plane.

2. The method according to claim 1, comprising, subsequent to said correlation step, a calculation step for calculating the distance of said object with respect to the first and second image capture devices.

3. The method according to claim 1, comprising, in the case where a sound is emitted by said object or in the vicinity of the latter, the following steps:
    calculation of the real distance which separates the object from said reference plane, on the basis of the intensity of said sound emitted,
        comparison of said calculated real distance with the real distance obtained in the course of the correlation step.

4. The processing method according to claim 1, comprising, subsequent to the correlation step, in the case where at least one other object is situated in the observation zone, a comparison step for comparing the real distances which separate each object from the reference plane.

5. The processing method according to claim 1, comprising a segmentation step for segmenting said image received.

6. A non-transitory recording medium readable by a computer on which is recorded a computer program comprising instructions for implementing the method for processing data according to claim 1, when said program is executed by a device for processing an image representative of an observation zone in which is situated an object arranged with respect to a reference plane, comprising means for receiving two images which have been captured beforehand by means of first and second image capture devices, and means for displaying said two images received.

7. A non-transitory recording medium readable by a computer on which is recorded a computer program comprising instructions for implementing the method for processing data according to claim 2, when it is executed by a device for processing an image representative of an observation zone in which is situated an object arranged with respect to a reference plane, comprising means for receiving said two images which have been captured beforehand by means of first and second image capture devices, and means for displaying said two images received.

8. The method according to claim 2, comprising, in the case where a sound is emitted by said object or in the vicinity of the latter, the following steps:
    calculation of the real distance which separates the object from said reference plane, on the basis of the intensity of said sound emitted,
        comparison of said calculated real distance with the real distance obtained in the course of the correlation step.

9. A non-transitory recording medium readable by a computer on which is recorded a computer program comprising instructions for implementing the method for processing data according to claim 8, when it is executed by a device for processing an image representative of an observation zone in which is situated an object arranged with respect to a reference plane, comprising means for receiving two images which have been captured beforehand by means of first and second image capture devices, and means for displaying said two images received.

10. A non-transitory recording medium readable by a computer on which is recorded a computer program comprising instructions for implementing the method for processing data according to claim 3, when it is executed by a device for processing an image representative of an observation zone in which is situated an object arranged with respect to a reference plane, comprising means for receiving two images which have been captured beforehand by means of first and second image capture devices, and means for displaying said two images received.

11. A non-transitory recording medium readable by a computer on which is recorded a computer program comprising instructions for implementing the method for processing data according to claim 4, when it is executed by a device for processing an image representative of an observation zone in which is situated an object arranged with respect to a reference plane, comprising means for receiving two images which have been captured beforehand by means of first and second image capture devices, and means for displaying said two images received.

12. A device for processing data, in particular an image representative of an observation zone in which is situated an object arranged with respect to a reference plane situated at a constant distance from a first image capture device and a second image capture device, the first image capture device being able to capture a conical beam and the second image capture device being able to capture a parallel beam, the object being for its part situated at a variable distance from the reference plane, said reference plane being situated at the intersection of the conical beam and of the parallel beam, the device comprising:

- means for receiving two images which have been captured beforehand by the first and second image capture devices, respectively,
- means for displaying said image received, said display means designed to display said two images in two juxtaposed windows of a screen, the first window comprising an object plane including said object, and the second window comprising the reference plane,
- means for determining in the displayed image the number of pixels separating two contiguous sides, respectively of the object plane and of the reference plane, and extending along a determined direction (X or Y),
- means for correlating the determined number of pixels with the value of the measurement of the real distance which separates said object from said reference plane.

13. The processing device according to claim 12, comprising means for calculating the distance of said object with respect to the first and second image capture devices.

14. The processing device according to claim 12, furthermore comprising:
- means for calculating, in the case where a sound is emitted by said object or in the vicinity of the latter, the real distance which separates said object from the reference plane, on the basis of the intensity of the sound emitted,
- means for comparing said calculated distance with the distance obtained by the correlation means.

15. The processing device according to claim 12, comprising comparison means for comparing the real distance which separates the object from the reference plane with the real distance which separates another object from the reference plane, in the observation zone.

16. The processing device according to claim 12, comprising means for segmenting said image received.

17. The processing device according to claim 13, furthermore comprising:
- means for calculating, in the case where a sound is emitted by said object or in the vicinity of the latter, the real distance which separates said object from the reference plane, on the basis of the intensity of the sound emitted,
- means for comparing said calculated distance with the distance obtained by the correlation means.

18. A system for measuring a real distance between at least one object and a reference plane, comprising a first image capture device and a second image capture device for capturing an observation zone in which is situated said object with respect to the reference plane situated at a constant distance from the first and second image capture devices, the first image capture device being able to capture a conical beam and the second image capture device being able to capture a parallel beam, the object being for its part situated at a variable distance from the reference plane, said reference plane being situated at the intersection of the conical beam and of the parallel beam, said system comprising:

- means for determining said reference plane as being the plane situated at the intersection of a conical beam and of a parallel beam emitted respectively by the first and second image capture devices,
- a device for processing data comprising: 999999
- means for receiving two images which have been captured beforehand by the first and second image capture devices, respectively,
- means for displaying said two images in two juxtaposed windows of a screen, the first window comprising an object plane including said object, and the second window comprising said reference plane,
- means for determining in the displayed image the number of pixels separating two contiguous sides, respectively of the object plane and of the reference plane, and extending along a determined direction (X or Y),
- means for correlating the determined number of pixels with the value of the measurement of the real distance which separates said object from said reference plane.

19. The system according to claim 18, furthermore comprising an acoustic measurement device which is intended to measure the intensity of a sound emitted by said object or in the vicinity of the latter, said device for processing data furthermore comprising:
- means for receiving the value of the measured intensity originating from the acoustic measurement device,
- means for calculating the real distance which separates the object from the reference plane, on the basis of the intensity of the sound emitted,
- means for comparing the calculated distance with the distance obtained by the correlation means.

* * * * *